US007841368B2

(12) United States Patent
McMasters et al.

(10) Patent No.: US 7,841,368 B2
(45) Date of Patent: Nov. 30, 2010

(54) UNITARY CONDUIT FOR TRANSPORTING FLUIDS

(75) Inventors: Marie Ann McMasters, Mason, OH (US); Michael A. Benjamin, Cincinnati, OH (US); Alfred Mancini, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/182,469

(22) Filed: Jul. 30, 2008

(65) Prior Publication Data
US 2009/0255602 A1 Oct. 15, 2009

Related U.S. Application Data

(60) Provisional application No. 61/044,116, filed on Apr. 11, 2008.

(51) Int. Cl.
*F16L 11/00* (2006.01)
(52) U.S. Cl. .................. 138/115; 138/117; 138/109
(58) Field of Classification Search ......... 138/115–117, 138/109; 285/124.4, 245; 52/731.2
See application file for complete search history.

(56) References Cited

U.S. PATENT DOCUMENTS

| 4,273,070 | A | * | 6/1981 | Hoefelmayr | 119/14.51 |
| 4,582,093 | A | * | 4/1986 | Hubbard et al. | 138/111 |
| 4,585,034 | A | * | 4/1986 | Hubbard et al. | 138/111 |
| 4,674,167 | A | * | 6/1987 | Hubbard et al. | 29/401.1 |
| 4,722,559 | A | * | 2/1988 | Bongartz | 285/122.1 |
| 5,057,073 | A | * | 10/1991 | Martin | 604/43 |
| 5,460,758 | A | | 10/1995 | Langer et al. | 264/401 |
| 5,501,840 | A | * | 3/1996 | Mantovani et al. | 422/101 |
| 6,068,330 | A | * | 5/2000 | Kasuga et al. | 296/187.09 |
| 6,269,540 | B1 | | 8/2001 | Islam et al. | 29/889.7 |
| 6,321,541 | B1 | | 11/2001 | Wrubel et al. | 60/740 |
| 6,355,086 | B2 | | 3/2002 | Brown et al. | 75/235 |
| 6,381,964 | B1 | | 5/2002 | Pritchard, Jr. | 60/746 |
| 6,389,815 | B1 | | 5/2002 | Hura et al. | 60/746 |
| 6,523,350 | B1 | | 2/2003 | Mancini et al. | 60/740 |
| 6,564,831 | B1 | * | 5/2003 | Sanoner et al. | 138/115 |
| 6,672,066 | B2 | | 1/2004 | Wrubel et al. | 60/740 |
| 6,672,654 | B2 | * | 1/2004 | Yamada et al. | 296/205 |
| 6,676,892 | B2 | | 1/2004 | Das et al. | 419/7 |
| 6,692,037 | B1 | * | 2/2004 | Lin | 285/124.1 |
| 6,705,383 | B2 | | 3/2004 | Beeck et al. | 164/76.1 |
| 6,711,898 | B2 | | 3/2004 | Laing et al. | 60/740 |
| 6,718,770 | B2 | | 4/2004 | Laing et al. | 60/740 |
| D498,825 | S | * | 11/2004 | Fu | D23/266 |
| 6,865,889 | B2 | | 3/2005 | Mancini | 60/737 |
| 6,951,227 | B1 | * | 10/2005 | Su | 138/115 |
| 2002/0152715 | A1 | * | 10/2002 | Rotheroe | 52/731.2 |
| 2007/0119177 | A1 | | 5/2007 | McMasters et al. | 60/737 |
| 2007/0163114 | A1 | | 7/2007 | Johnson | 29/889.2 |

* cited by examiner

*Primary Examiner*—Patrick F Brinson
(74) *Attorney, Agent, or Firm*—V G Ramaswamy; William Scott Andes; General Electric Company

(57) ABSTRACT

A unitary conduit for transporting a fluid is described, the conduit comprising a body and a flow passage located within the body, the flow passage having an inlet end and an exit end, wherein the flow passage and the body have a unitary construction. In another embodiment, a unitary conduit has a flow passage wherein the cross sectional shape of the flow passage changes from a first cross sectional shape to a second cross sectional shape. In another embodiment, the exterior contour of the body generally conforms to the interior contour of the flow passage. In another embodiment, the flow passage branches to a plurality of sub-passages.

14 Claims, 10 Drawing Sheets

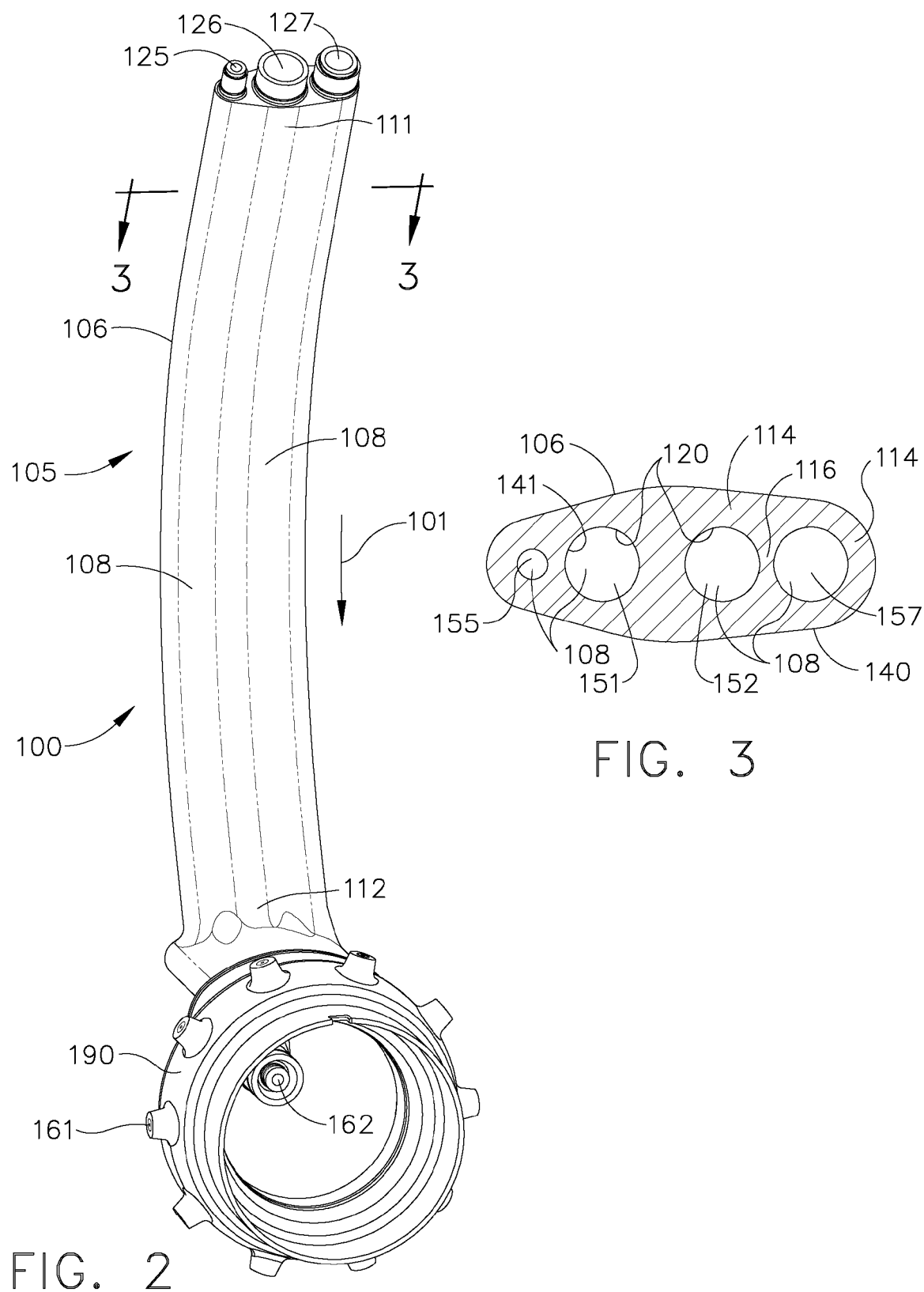

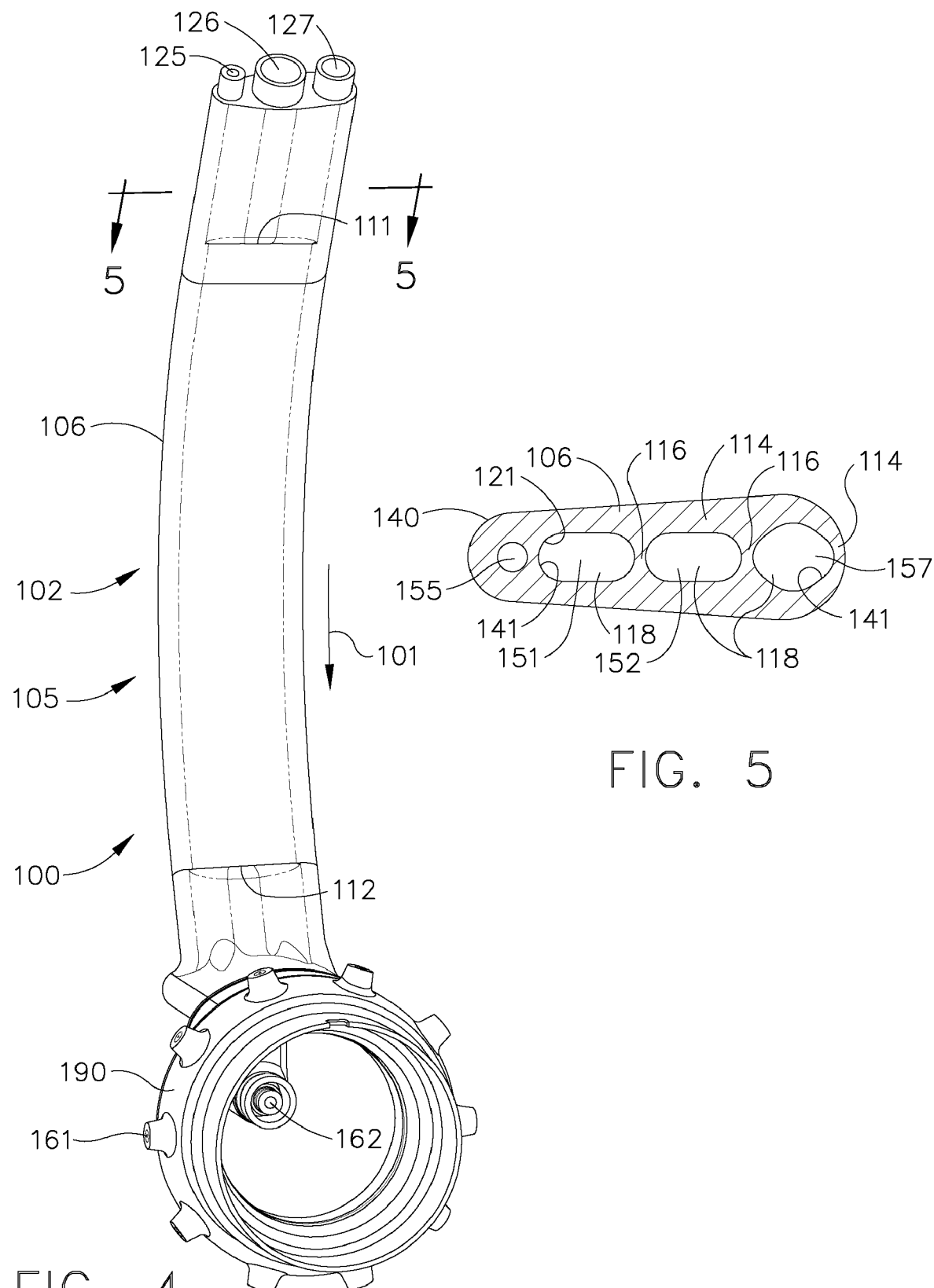

_US 7,841,368 B2_

UNITARY CONDUIT FOR TRANSPORTING FLUIDS

CROSS-REFERENCE TO RELATED APPLICATIONS

This Application claims priority to U.S. Provisional Application Ser. No. 61/044,116, filed Apr. 11, 2008, which is herein incorporated by reference in its entirety.

BACKGROUND OF THE INVENTION

This invention relates generally to conduits for transporting fluids, and more specifically to unitary conduits for transporting fuel into fuel nozzles used in gas turbine engines.

Turbine engines typically include a plurality of fuel nozzles for supplying fuel to the combustor in the engine. The fuel is introduced at the front end of a burner in a highly atomized spray from a fuel nozzle. Compressed air flows around the fuel nozzle and mixes with the fuel to form a fuel-air mixture, which is ignited by the burner. Because of limited fuel pressure availability and a wide range of required fuel flow, many fuel injectors include pilot and main nozzles, with only the pilot nozzles being used during start-up, and both nozzles being used during higher power operation. The flow to the main nozzles is reduced or stopped during start-up and lower power operation. Such injectors can be more efficient and cleaner-burning than single nozzle fuel injectors, as the fuel flow can be more accurately controlled and the fuel spray more accurately directed for the particular combustor requirement. The pilot and main nozzles can be contained within the same nozzle assembly or can be supported in separate nozzle assemblies. These dual nozzle fuel injectors can also be constructed to allow further control of the fuel for dual combustors, providing even greater fuel efficiency and reduction of harmful emissions. The temperature of the ignited fuel-air mixture can reach an excess of 3500° F. (1920° C.). It is therefore important that the fuel supply conduits, flow passages and distribution systems are substantially leak free and are protected from the flames and heat.

Over time, continued exposure to high temperatures during turbine engine operations may induce thermal stresses in the conduits and fuel nozzles which may damage the conduits or fuel nozzle and may adversely affect their operation. For example, thermal stresses may cause fuel flow reductions in the conduits and may lead to excessive fuel maldistribution within the turbine engine. Furthermore, over time, continued operation with damaged fuel nozzles may result in decreased turbine efficiency, turbine component distress, and/or reduced engine exhaust gas temperature margin.

Improving the life cycle of fuel nozzles installed within the turbine engine may extend the longevity of the turbine engine. Known fuel nozzles include a delivery system and a support system. The delivery system comprising conduits for transporting fluids delivers fuel to the turbine engine and is supported, and is shielded within the turbine engine, by the support system. More specifically, known support systems surround the delivery system, and as such are subjected to higher temperatures and have higher operating temperatures than delivery systems which are cooled by fluid flowing through the fuel nozzle. It may be possible to reduce the thermal stresses in the conduits and fuel nozzles by configuring their external and internal contours and thicknesses.

Conventional gas turbine engine components such as, for example, fuel nozzles and their associated conduits, are generally expensive to fabricate and/or repair because the conventional fuel nozzle designs having complex conduits for transporting fuel include a complex assembly and joining of more than thirty components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the component.

Accordingly, it would be desirable to have conduits for transporting fluids such as, for example, fuel supply conduits for fuel nozzles, that have unitary construction for reducing potential leakage and other undesirable effects described earlier. It is desirable to have fluid supply conduits with complex geometries having a unitary construction to reduce the cost and for ease of assembly. It is desirable to have a method of manufacturing unitary conduits having complex three-dimensional geometries for transporting fluids, such as fuel supply conduits for fuel nozzles.

BRIEF DESCRIPTION OF THE INVENTION

The above-mentioned need or needs may be met by exemplary embodiments which provide a unitary conduit for transporting a fluid, the conduit comprising a body and a flow passage located within the body, the flow passage having an inlet end and an exit end, wherein the flow passage and the body have a unitary construction.

In another embodiment, a unitary conduit has a flow passage wherein the cross sectional shape of the flow passage changes from a first cross sectional shape to a second cross sectional shape.

In another embodiment, a unitary conduit comprises a body, a flow passage located within the body, wherein the exterior contour of the body generally conforms to the interior contour of the flow passage.

In another embodiment, a unitary conduit comprises a flow passage, wherein the flow passage branches to a plurality of sub-passages located within a body and wherein the flow passage and the body have a unitary construction.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 2 is an isometric view of a fuel distributor having a unitary conduit according to an exemplary embodiment of the present invention.

FIG. 3 is a transverse cross-sectional view of the unitary conduit shown in FIG. 2.

FIG. 4 is an isometric view of a fuel distributor having a unitary conduit according to an alternative exemplary embodiment of the present invention.

FIG. 5 is a transverse cross-sectional view of the unitary conduit shown in FIG. 4.

DETAILED DESCRIPTION OF THE INVENTION

Figure 1:
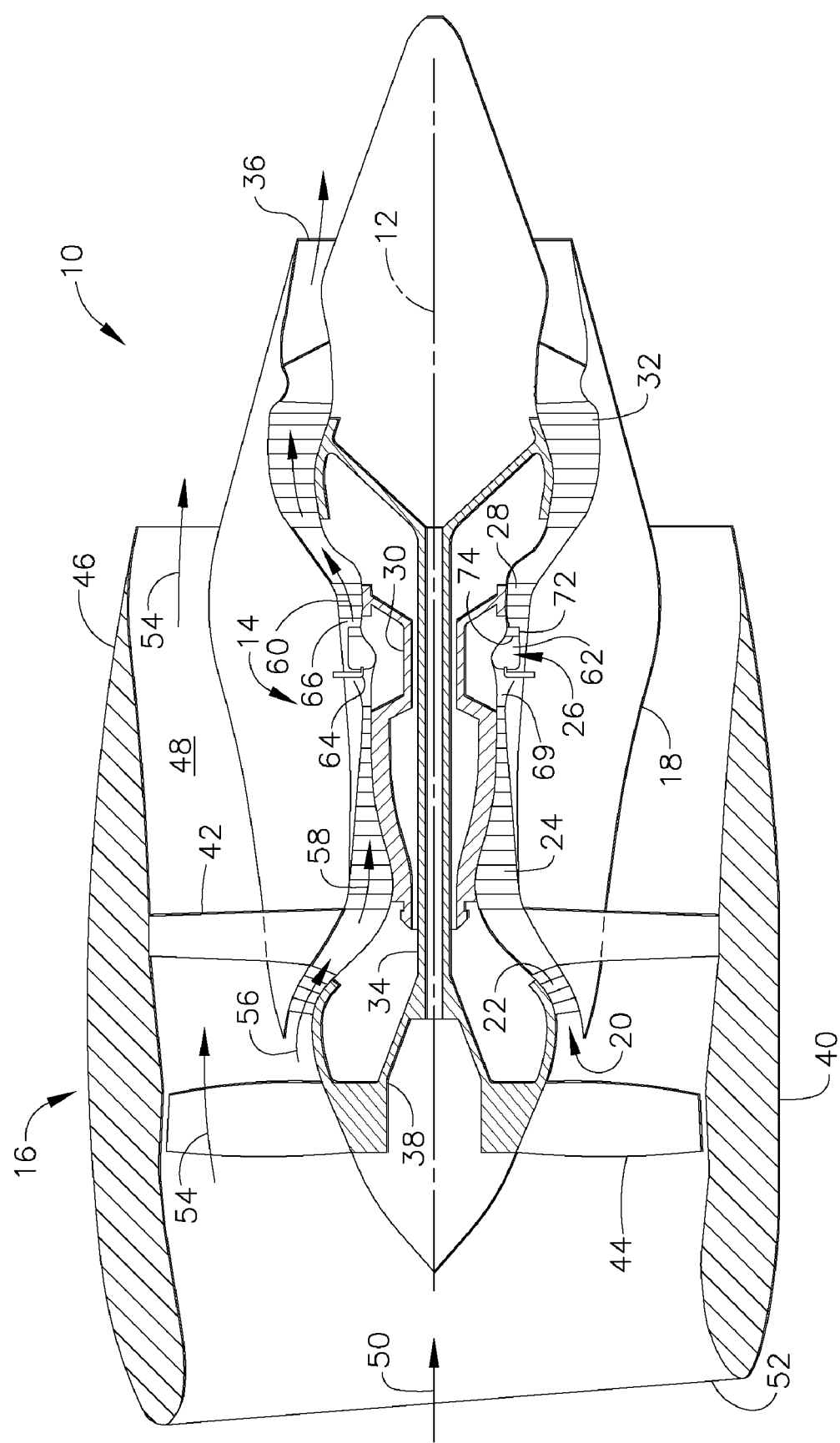
FIG. 1 is a diagrammatic view of a high bypass turbofan gas turbine engine.
Figure 6:
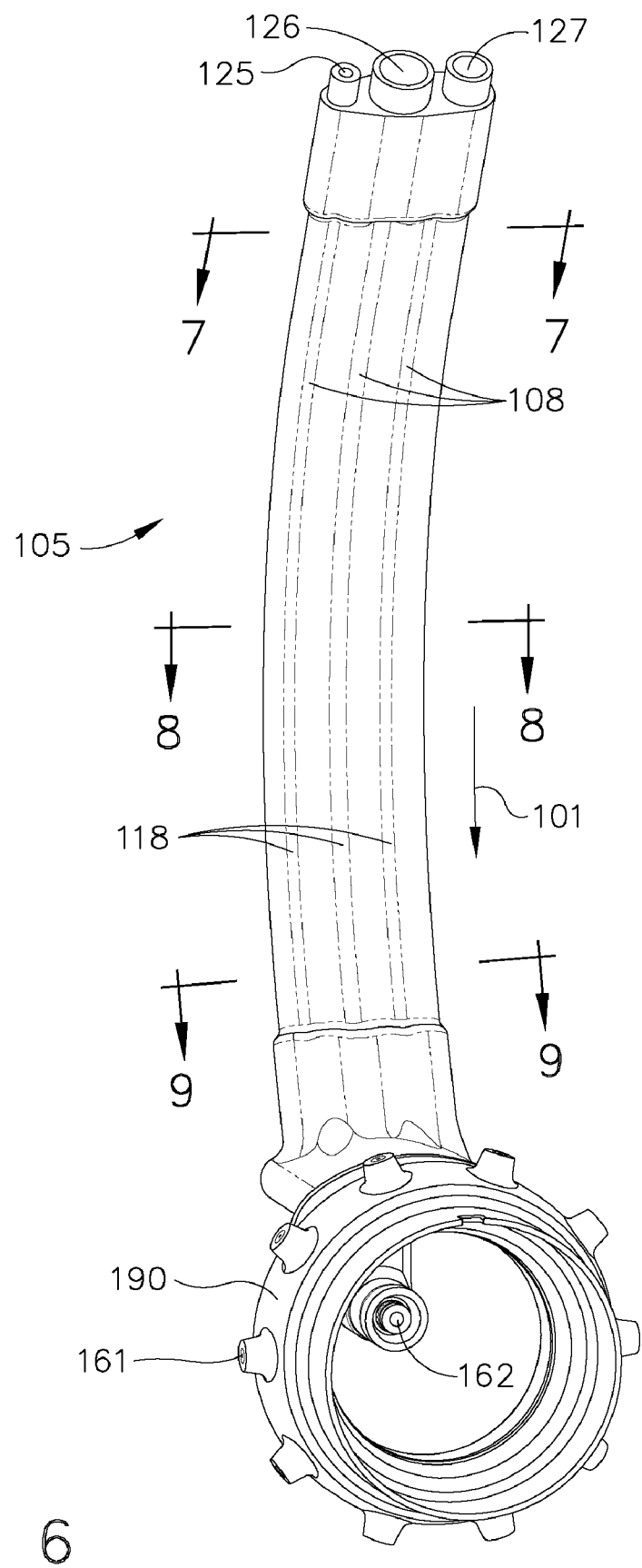
FIG. 6 is an isometric view of a fuel distributor having a unitary conduit according to another alternative exemplary embodiment of the present invention.

Referring now to the drawings in detail, wherein identical numerals indicate the same elements throughout the figures, FIG. 1 shows in diagrammatic form an exemplary gas turbine engine 10 (high bypass type) incorporating an exemplary embodiment of a unitary conduit for transporting liquid fuel to fuel injectors. The exemplary gas turbine engine 10 has an axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream and ignited to raise the temperature and energy level of the pressurized air. The high energy combustion products flow from combustor 26 to a first (high pressure) turbine 28 for driving the high pressure compressor 24 through a first (high pressure) drive shaft 30, and then to a second (low pressure) turbine 32 for driving booster 22 and fan section 16 through a second (low pressure) drive shaft 34 that is coaxial with first drive shaft 30. After driving each of turbines 28 and 32, the combustion products leave core engine 14 through an exhaust nozzle 36 to provide at least a portion of the jet propulsive thrust of the engine 10.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional jet propulsive thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster 22.

The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide at least a portion of the thrust for gas turbine engine 10.

The combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixer (not shown). Fuel is injected from a fuel nozzle tip assembly to mix with the air and form a fuel-air mixture that is provided to combustion chamber 62 for combustion. Ignition of the fuel-air mixture is accomplished by a suitable igniter, and the resulting combustion gases 60 flow in an axial direction toward and into an annular, first stage turbine nozzle 72. Nozzle 72 is defined by an annular flow channel that includes a plurality of radially-extending, circumferentially-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster 24 and fan rotor 38 via second drive shaft 34.

Combustion chamber 62 is housed within engine outer casing 18. Fuel is supplied into the combustion chamber by fuel nozzles, such as for example shown in FIGS. 11, 12 and 13. Liquid fuel is transported through unitary conduits 105 (i.e., conduits having a unitary construction), such as shown for example, in FIGS. 2, 4, 6 and 10. The unitary conduits 105 may be located within a stem 102 and coupled to a fuel distributor tip 190. Pilot fuel and main fuel is sprayed into the combustor 26 by fuel nozzle tip assemblies, using conventional means. During operation of the turbine engine, initially, pilot fuel is supplied through the pilot fuel passageway 153 (see, for example, FIG. 10) during pre-determined engine operation conditions, such as during startup and idle operations. The pilot fuel is discharged from fuel distributor tip 190 through the pilot fuel outlet 162. When additional power is demanded, main fuel is supplied through main fuel passageways 151, 152 (see, for example, FIG. 10) and the main fuel is sprayed using the main fuel outlets 161.

FIGS. 2-10 show exemplary embodiments of the present invention of a unitary conduit 105 for transporting fluids. The term "unitary" is used in this application to denote that the associated component, such as the conduit 105 described herein, is made as a single piece during manufacturing. Thus, a unitary component has a monolithic construction for the entire component, and is different from a component that has been made from a plurality of component pieces that have been joined together to form a single component.

FIG. 2 shows an isometric view of a fuel distributor 100 having a unitary conduit 105 according to an exemplary embodiment of the present invention. The exemplary fuel distributor 100 shown in FIG. 2 comprises a unitary conduit 105 and a distributor tip 190. The unitary conduit 105 and the distributor tip 190 may have a unitary construction as shown in FIG. 2 made using methods described subsequently herein. Alternatively, the fuel distributor 100 may be fabricated by making the distributor tip 190 and the unitary conduit 105 separately and coupling them together using suitable conventional attachment means such that the distributor tip 190 is in flow communication with the unitary conduit 105.

As shown in FIGS. 2-10, the unitary conduit 105 comprises one or more flow passages 108 located within a body 106. The unitary conduit 105 has an inlet end 111 and an exit end 112. Fluid enters the conduit 105 at the inlet end 111 and flows in a longitudinal direction 101 towards the exit end 112, and exits from the conduit 105 at the exit end 112. FIG. 3 shows a transverse cross-sectional view of the exemplary unitary conduit shown in FIG. 2. As shown in FIG. 2, the unitary conduit 105 comprises a body 106 having an exterior contour 140 and multiple flow passages 108 located within the body 106. The flow passages have a cross sectional shape 120 and an interior contour 141. In the exemplary embodiment shown in FIG. 3, there are four passages, each having a circular cross-sectional shape. As shown in FIG. 2, the flow passages may have different sizes. For example, in the exemplary embodiment shown in FIG. 2, the two outwardly located passages 155, 157 are pilot fuel flow passages and the two interior passages 151, 152 are main fuel flow passages used in a fuel distributor 100. Each flow passage 108 has a wall, such as, for example, shown as item 114, that separates the interior contour 141 of the flow passage 108 from the exterior contour 140 of the body 106. Adjacently located flow passages 108 within the body 106 are separated from each other by a separation wall, such as, for example, shown as item 116. In the exemplary embodiment shown in FIGS. 2 and 3, the main flow passages 151, 152 each have a diameter between about 0.060 inches and 0.150 inches, and the pilot flow passages 155, 157 each have a diameter between about 0.040 inches and 0.150 inches. The wall 114 has a thickness between about 0.020 inches and 0.060 inches. The separation wall 116 has a thickness between about 0.020 inches and 0.060 inches.

Circular cross sections usually have been selected in flow passages based on manufacturing considerations However, it is advantageous in certain cases, such as for example in fuel circuits that are subjected to thermal stresses, to have flow passages 118 that have a non-circular cross section. It is possible to reduce stress concentrations in flow passages 108 by suitably contouring the interior portions of the flow passage 108 and the exterior contour 140 of the body 106. The flow passages 108 can be round (see FIG. 3) or ovalized (FIG. 5). The round passages would provide a smaller length, but a larger width. The ovalized passages would provide a smaller width, but a larger length. The smaller width provides more flexibility in the supply portion of the unitary conduit 105 and facilitates reduction of the thermal stresses in the body 106. FIG. 4 shows an isometric view of a fuel distributor having a unitary conduit 105 according to an alternative exemplary embodiment of the present invention, wherein a flow passage 118 has a non-circular cross sectional shape 121. FIG. 5 shows a transverse cross-sectional view of the unitary conduit 105 shown in FIG. 4. The interior contour 141 of each flow passage 118 can be selected to be circular, non-circular or any suitable combination of circular and non-circular shapes. FIG. 5 shows an exemplary embodiment of a unitary conduit 105 having one flow passage with a circular contour and three flow passages 118 with non-circular contours 141. Each flow passage 118 has a wall 114 that separates its interior contour 141 from the exterior contour 140 of the body 106. Adjacently located flow passages 118 within the body 106 are separated from each other by a separation wall 116. In the exemplary embodiment shown in FIG. 5, the non-circular flow passages 118 have cross-sectional areas between about 0.004 square-inches and 0.018 square-inches, and the circular pilot flow passage has a cross-sectional area of about 0.005 square-inches. The wall 114 has a thickness between about 0.020 inches and 0.060 inches. The separation wall 116 has a thickness between about 0.020 inches and 0.060 inches.

In the exemplary embodiments of the unitary conduit 105 shown in FIGS. 2-5, the cross-sectional shapes 120, 121 of the flow passages 108 remains substantially constant from the inlet end 111 to the exit end 112 of the unitary conduit 105. Similarly, the cross-sectional areas of each flow passage 108 may be substantially constant from the inlet end 111 to the exit end 112 of the unitary conduit 105. Alternately, the cross-sectional area of a flow passage 108 may be varied, preferably substantially uniformly, from the inlet end 111 to the exit end 112 of the unitary conduit 105, in order to achieve suitable flow characteristics within the distributor tip 190 of the fuel nozzle. For example, it is possible to accelerate the fluid in some flow passages 108 within the unitary conduit 105 by reducing the flow area, preferably substantially uniformly, between the inlet end 111 and the exit end 112.

Figure 7:
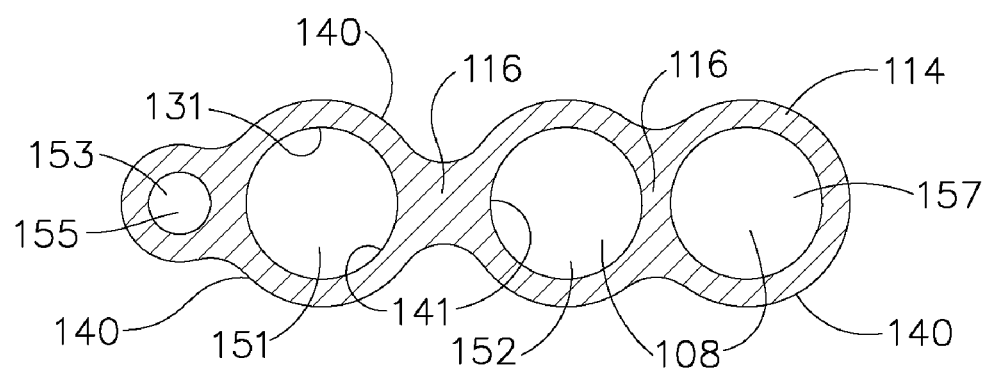
FIG. 7 is a transverse cross-sectional view near an inlet end of the unitary conduit shown in FIG. 6.
Figure 8:
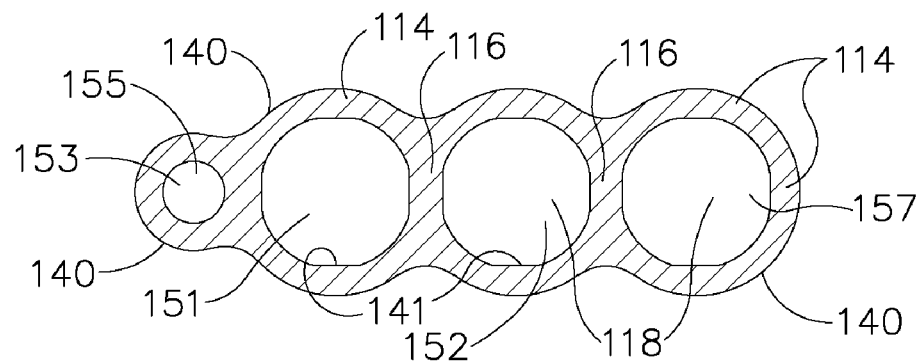
FIG. 8 is a transverse cross-sectional view at an intermediate location of the unitary conduit shown in FIG. 6.
Figure 9:
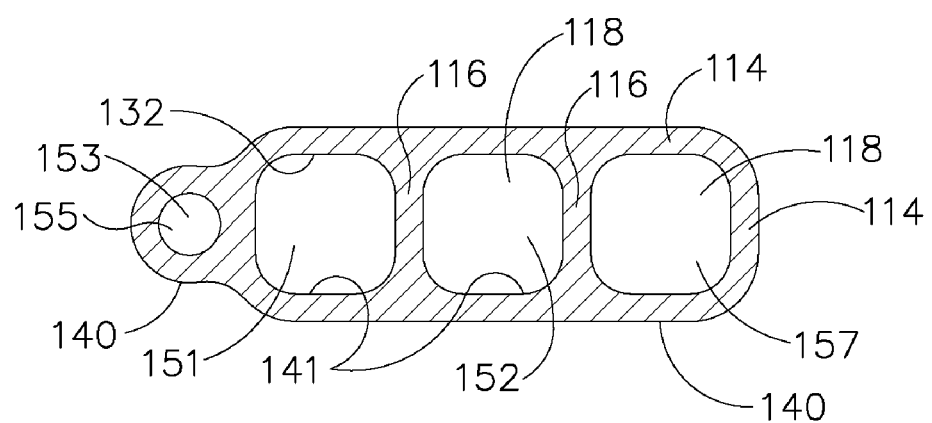
FIG. 9 is a transverse cross-sectional view near an exit end of the unitary conduit shown in FIG. 6.

In some applications, it is advantageous to vary the interior contour 141 and cross-sectional area of the flow passage 108 in the unitary conduit 105 between the inlet end 111 and the exit end 112. FIGS. 6-9 show an exemplary embodiment of a unitary conduit 105 having four flow passages 108 that having a first cross sectional shape 131 near the inlet end 111 and a second cross sectional shape 132 near the exit end 112. The cross sectional shape 141 changes substantially uniformly between the first cross sectional shape 131 near the inlet end 111 and the second cross sectional shape 132 near the exit end 112. FIG. 7-9 show transverse cross sections of the unitary conduit 105 near the inlet end 111, at the exit end 112 and at an intermediate location between the inlet end 111 and the exit end 112. As shown in FIGS. 7-9, the first cross-sectional shape 131 is circular for each of the four passages 108. The second cross-sectional shape 132 near the exit end 112 is non-circular for three of the passages and remains circular for the fourth passage (pilot passage 153). FIG. 8 shows cross section at an intermediate location, showing the transition from a circular cross-section to a non-circular cross section for the three flow passages 118.

In addition to varying the cross-sectional shapes 131, 132, it may be advantageous to vary the thicknesses for the walls 114 and the separation walls 116 in the unitary conduit 105 in order to reduce thermal stresses and weight. For example, the unitary conduit 105 may be transitioned from a thicker section from a valve braze area near the inlet end 111 to a thinner section near the exit end 112 located near the distributor tip 190, to reduce thermal stresses in the unitary conduit 105. The wall thickness 114 for the fuel passages 108 may be maintained substantially constant at a particular cross section, as shown in FIG. 7 to reduce the weight. Alternatively, at a particular cross section, body 106 exterior contour 140 and the wall thickness 114 for the fuel passages 108 may be contoured to obtain a flat outer surface between the right-most and left-most fuel passages, as shown in FIG. 5. It may be advantageous to have a combination of the approaches described above at different cross sectional locations on the unitary conduit 105, based on the thermal stresses profiles at those locations. The unitary conduit 105 cross sections and exterior contour 140 may be shaped to generally conform to the shape of the passages in the body 106 (see FIGS. 7-9), or they can be shaped to have a smoother external surface (see FIGS. 3, 5). In fuel nozzle applications of the unitary conduit 105, it is possible to locate one or more pilot supply conduits, such as described below, such that the fuel flowing through the pilot supply conduits cools the body 106 and the fluid passages located within, and facilitates the reduction of thermal stresses.

Figure 10:
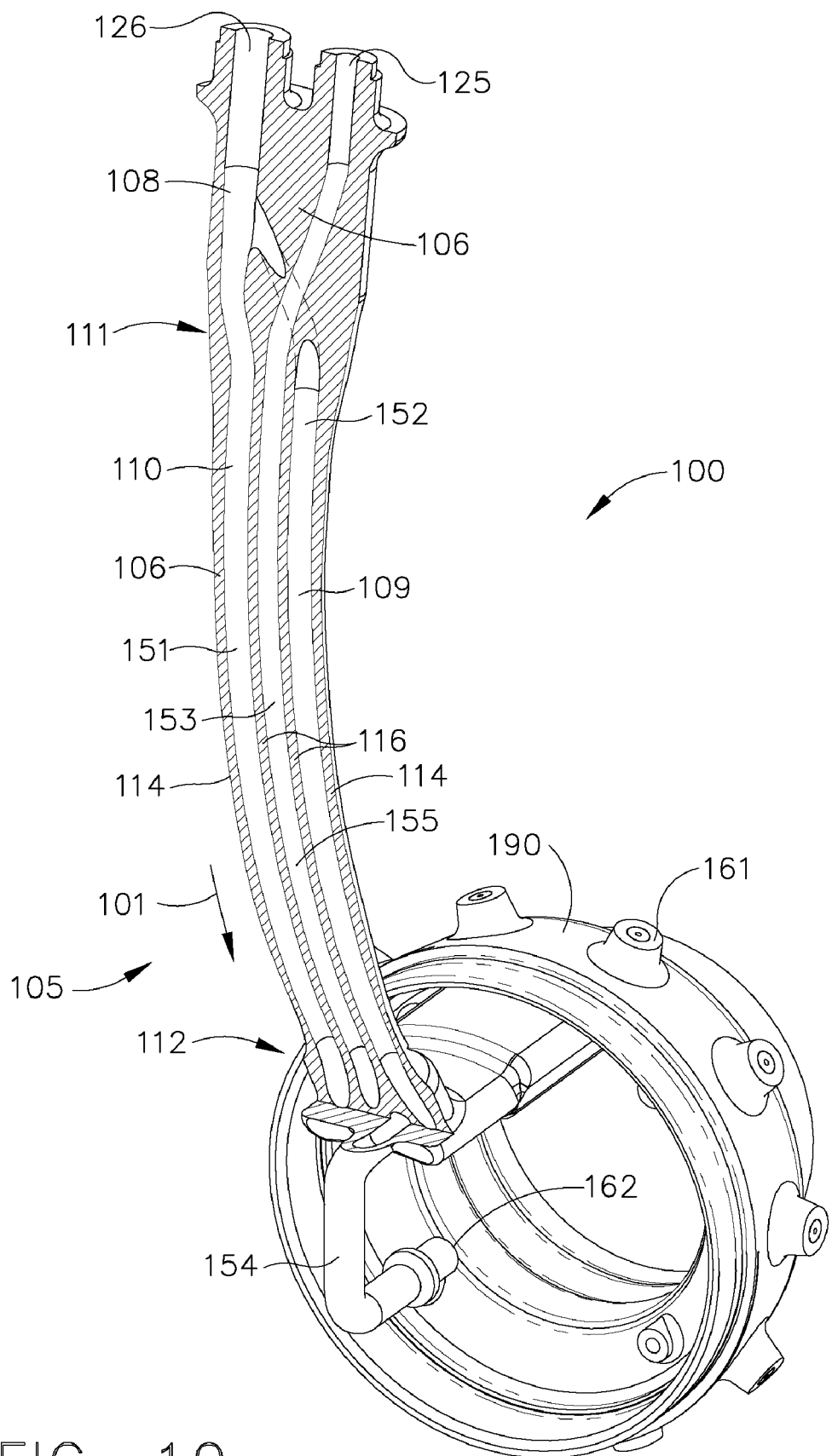
FIG. 10 is an isometric longitudinal cross sectional view of a unitary conduit according to another exemplary embodiment of the present invention.

FIG. 10 is a partial cross-sectional isometric view of an exemplary unitary conduit 105 used for transporting liquid fuel in a fuel nozzle. In the exemplary embodiment, the unitary conduit 105 includes a flow passage 108 located within the body 106 which serves as the main fuel passageway into the fuel nozzle, and a pilot fuel passage 153 extending within the body 106. Fuel from the pilot fuel passage 153 is directed into the fuel nozzle by a pilot supply tube 154 and exits through a pilot fuel outlet 162. In some unitary conduits 105, it is advantageous to have a flow passage 108 that branches into two or more sub-passages 109, 110, such as, shown for example, in FIG. 10. As shown in FIG. 10 for a fuel nozzle application of the unitary conduit 105, the flow passage 108 branches into a first main passage 151 and a second main passage 152. Liquid fuel is supplied into the nozzle through a main passage inlet 126 and enters the flow passage 108. The fuel flow then branches into the two streams, one through the first main passage 151 and the other through the second main passage 152, before entering the distributor tip 190. As shown in FIG. 10, the main fuel passageway 108, the sub-passages 151, 152, and the pilot fuel passageway 153 extend generally axially in a longitudinal direction 101 in the body 106, between the inlet end 111 and the exit end 112.

Figure 11:
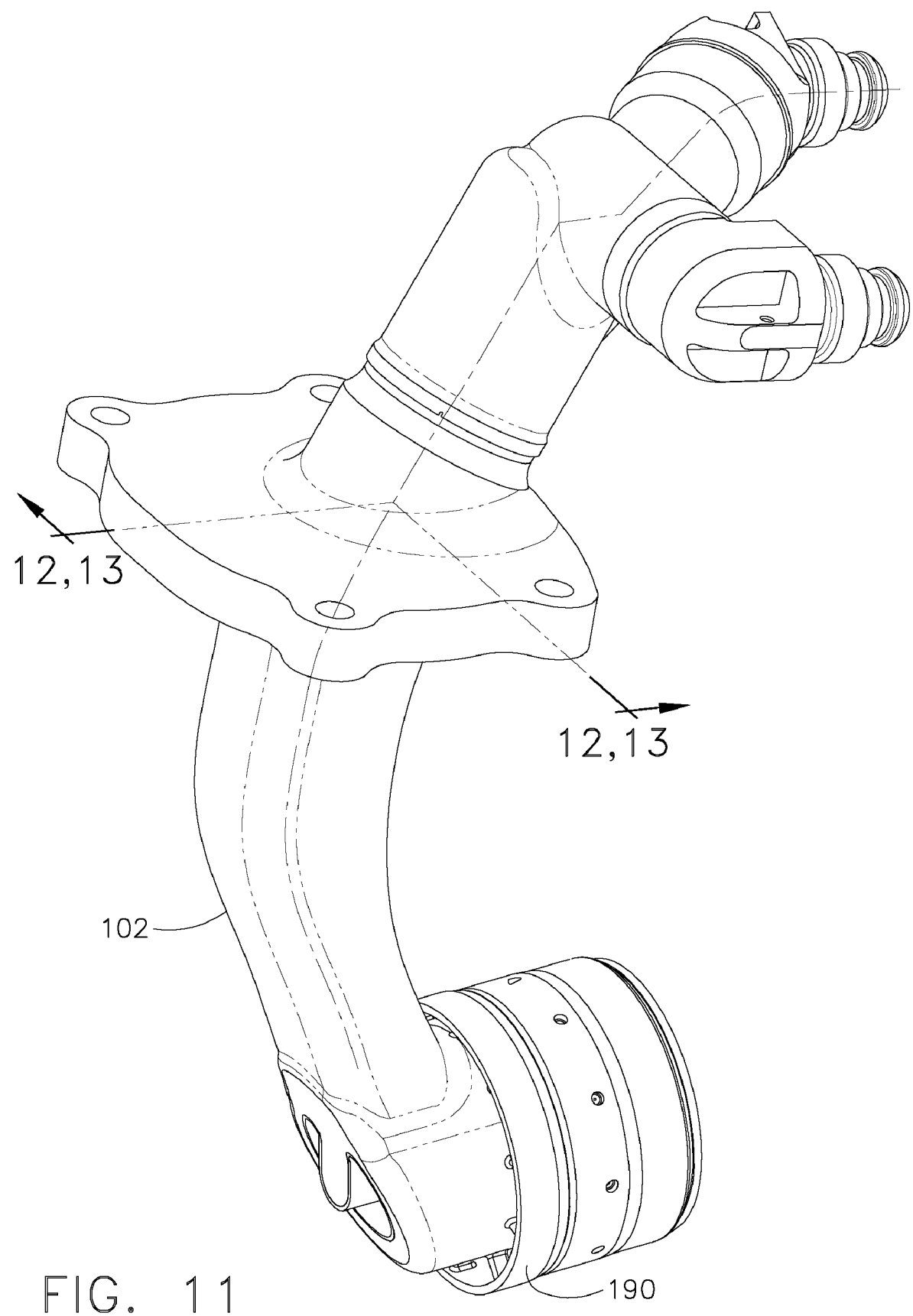
FIG. 11 is an isometric view of an exemplary fuel nozzle having a unitary conduit according to an exemplary embodiment of the present invention.
Figure 12:
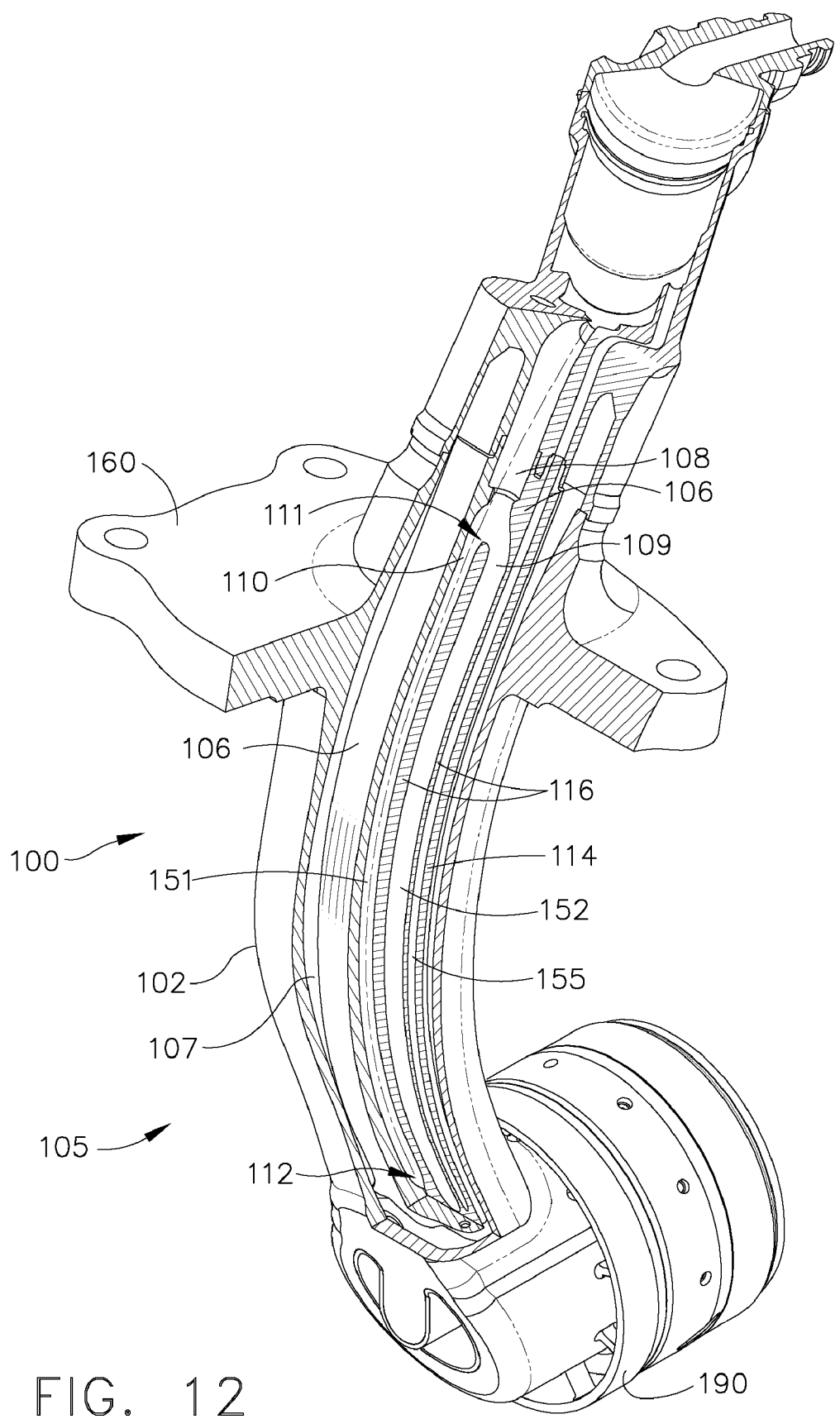
FIG. 12 is a partial isometric cross-sectional view of the exemplary fuel nozzle shown in FIG. 11.
Figure 13:
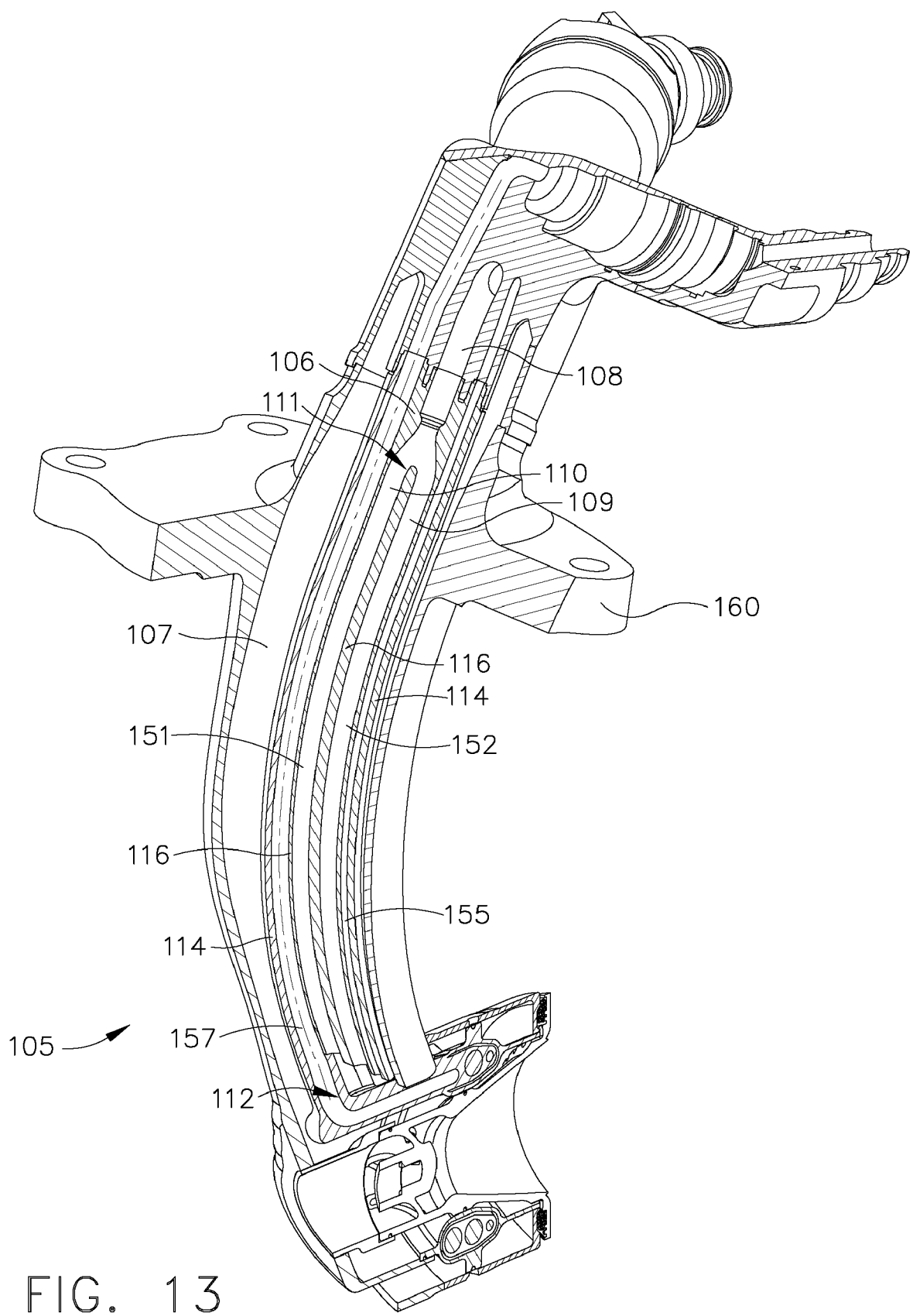
FIG. 13 is a partial isometric cross-sectional view of the exemplary fuel nozzle shown in FIG. 11.

An exemplary fuel distributor 100 having a unitary conduit 105 as described herein and used in a gas turbine engine fuel nozzle is shown in FIGS. 11-13. In the exemplary embodiment, the unitary conduit 105 is located within a stem 102 which has a flange 160 for mounting in a gas turbine engine 10. The unitary conduit 105 is located within the stem 102 such that there is a gap 107 between the interior of the stem and the body 106 of the unitary conduit 105. The gap 107 insulates the unitary conduit 105 from heat and other adverse environmental conditions surrounding the fuel nozzle in gas turbine engines. Additional cooling of the unitary conduit 105 may be accomplished by circulating air in the gap 107. The unitary conduit 105 is attached to the stem 102 using conventional attachment means such as brazing. Alternatively, the unitary conduit 105 and the stem 102 may be made by rapid manufacturing methods such as for example, direct laser metal sintering, described herein. In the exemplary embodiment, fuel distributor tip 190 extends from the unitary conduit 105 and stem 102 such that main fuel passageways (first main passage 151 and the second main passage 152) and the pilot fuel passageway 153 are coupled in flow communication with fuel distributor tip 190, such as, for example, shown in FIG. 13. Specifically, main fuel passageways 151, 152 are coupled in flow communication to main fuel circuits defined within fuel distributor tip 190. Likewise, primary pilot passage 155 and secondary pilot passage 157 are coupled in flow communication with corresponding pilot injectors (not shown) positioned radially inward within fuel nozzle.

The exemplary embodiment of the unitary conduit 105 the shown in FIGS. 2-3, and the alternative embodiments of the unitary conduit 105 shown in FIGS. 4-13, can be made using rapid manufacturing processes such as Direct Metal Laser Sintering (DMLS), Laser Net Shape Manufacturing (LNSM), electron beam sintering and other known processes in the manufacturing. DMLS is a preferred method of manufacturing unitary fuel nozzle components such as the fuel distributors 60, 160 and swirler 50 described herein.

Figure 14:
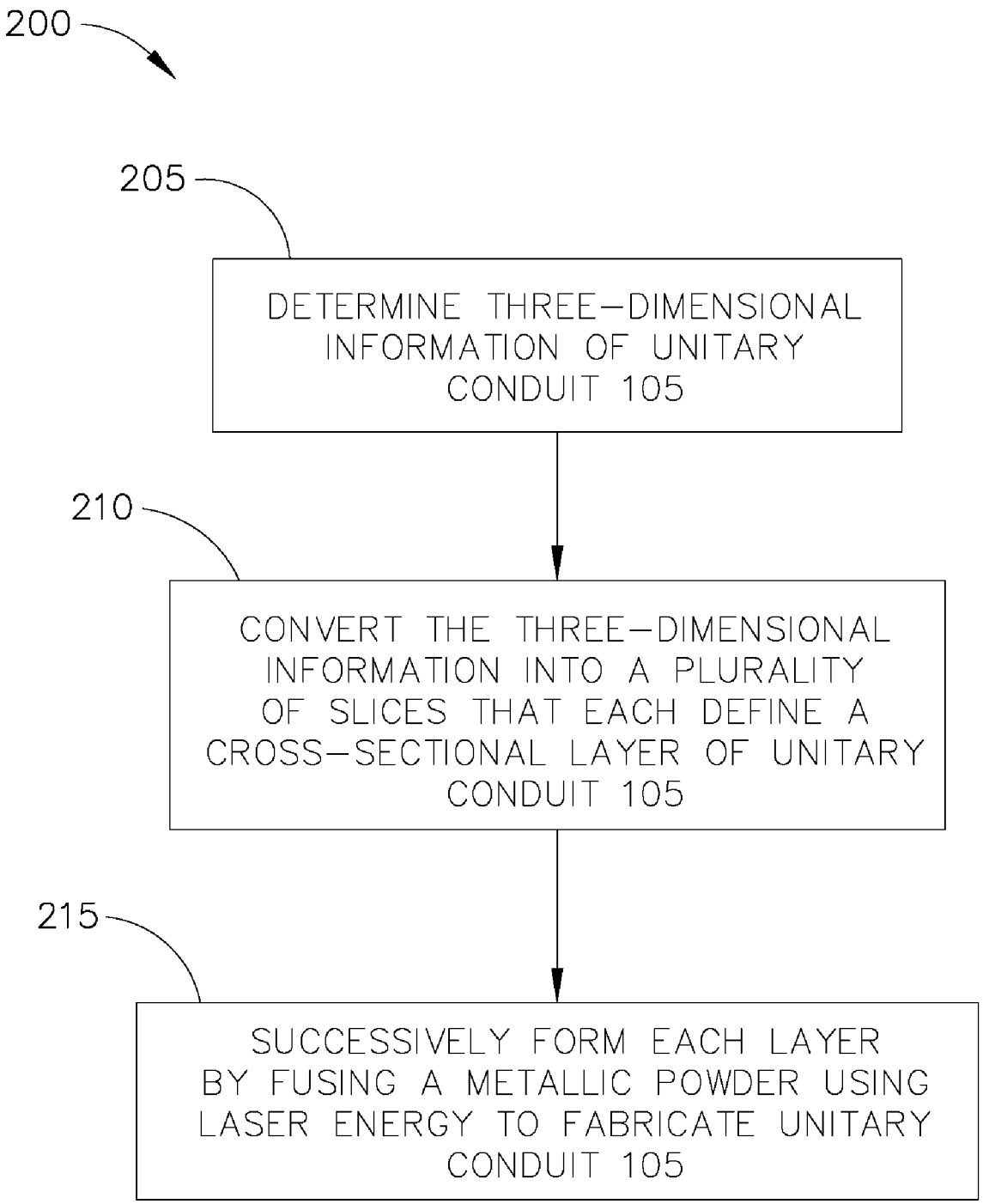
FIG. 14 is a flow chart showing an exemplary embodiment of a method for fabricating a unitary conduit.

FIG. 14 is a flow chart illustrating an exemplary embodiment of a method 200 for fabricating unitary conduits 105 described herein. Method 200 includes fabricating unitary conduit 105 (shown in FIGS. 2-13) using Direct Metal Laser Sintering (DMLS). DMLS is a known manufacturing process that fabricates metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished. Each layer of the component is formed by fusing a metallic powder using a laser.

Accordingly, method 200 includes the step 205 of determining three-dimensional information of unitary conduit 105 and the step 210 of converting the three-dimensional information into a plurality of slices that each define a cross-sectional layer of the unitary conduit 105. The unitary conduit 105 is then fabricated using DMLS, or more specifically each layer is successively formed 215 by fusing a metallic powder using laser energy. Each layer has a size between about 0.0005 inches and about 0.001 inches. Unitary conduits 105 may be fabricated using any suitable laser sintering machine. Examples of suitable laser sintering machines include, but are not limited to, an EOSINT® M 270 DMLS machine, a PHENIX PM250 machine, and/or an EOSINT® M 250 Xtended DMLS machine, available from EOS of North America, Inc. of Novi, Mich. The metallic powder used to fabricate unitary fuel nozzle components 50, 60, 160 is preferably a powder including cobalt chromium, but may be any other suitable metallic powder, such as, but not limited to, HS188 and INCO625. The metallic powder can have a particle size of between about 10 microns and 74 microns, preferably between about 15 microns and about 30 microns.

Although the methods of manufacturing unitary conduits 105 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

The unitary conduit 105 for a fuel distributor 100 in a turbine engine (see FIGS. 11-13) comprises fewer components and joints than known fuel nozzles. Specifically, the above described unitary conduit 105 requires fewer components because of the use of a one-piece body 106 having one or more flow passages such as, for example, shown as items 108, 118, 155, 157, 151 and 152 in FIGS. 2-13 herein. As a result, the described fuel distributor 100 provides a lighter, less costly alternative to known fuel distributors. Moreover, the described unitary conduits 105 provides fewer opportunities for leakage or failure and is more easily repairable compared to known conduits.

As used herein, an element or step recited in the singular and proceeded with the word "a" or "an" should be understood as not excluding plural said elements or steps, unless such exclusion is explicitly recited. When introducing elements/components/etc. of the methods and/or unitary conduits or fuel distributors 100 described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Furthermore, references to "one embodiment" of the present invention are not intended to be interpreted as excluding the existence of additional embodiments that also incorporate the recited features.

Although the methods and unitary conduits 105 described herein are described in the context of supplying liquid fuel to a turbine engine, it is understood that the unitary conduits 105 and methods of their manufacture described herein are not limited to fuel distributors or turbine engines. The unitary conduits 105 or fuel distributor 100 components illustrated are not limited to the specific embodiments described herein, but rather, these can be utilized independently and separately from other components described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A unitary conduit for transporting a fluid, the conduit comprising:
    a body; and
    a plurality of flow passages located within the body, at least one flow passage having an inlet end and an exit end, wherein the plurality of flow passages and the body have a unitary construction wherein each flow passage is separated from an adjacent flow passage by a separation wall that prevents a flow through the separation wall and wherein the body is made using a metallic powder and has a contour adapted to facilitate a reduction in stress.

2. A unitary conduit according to claim 1 wherein at least one flow passage has a cross sectional shape that is substantially constant from the inlet end to the exit end.

3. A unitary conduit according to claim 2 wherein the cross sectional shape is substantially circular.

4. A unitary conduit according to claim 1 wherein at least one flow passage has a cross sectional area that is substantially constant from the inlet end to the exit end.

5. A unitary conduit for transporting a fluid, the conduit comprising:
    a body; and
    a flow passage located within the body, said flow passage having an inlet end and an exit end, wherein the flow passage and the body have a unitary construction and wherein the body is made from a metallic material and has a contour adapted to facilitate a reduction in stress wherein the cross sectional area of the flow passage varies substantially uniformly from the inlet end to the exit end.

6. A unitary conduit according to claim 5 wherein the flow passage has a first cross sectional shape near the inlet end and a second cross sectional shape near the exit end wherein the cross sectional shape changes substantially uniformly from the first cross sectional shape near the inlet end to the second cross sectional shape near the exit end.

7. A unitary conduit according to claim 6 wherein the first cross sectional shape is substantially circular and the second cross sectional shape is substantially non-circular.

8. A unitary conduit for transporting a fluid, the conduit comprising:
    a body made using a metallic powder, the body having an exterior contour;
    a plurality of flow passages located within the body, each flow passage having an interior contour wherein the exterior contour of the body generally conforms to the interior contours of the flow passages and is adapted to facilitate a reduction in stress wherein the flow passages and the body have a unitary construction; and
    wherein each flow passage is separated from an adjacent flow passage by a separation wall that prevents a flow through the separation wall.

9. A unitary conduit for transporting a fluid, the conduit comprising:
    a body made from a metallic material, the body having an exterior contour;
    a flow passage located within the body, said flow passage having an interior contour, an inlet end and an exit end, wherein the exterior contour of the body generally conforms to the interior contour of the flow passage and is adapted to facilitate a reduction in stress;
    a plurality of flow passages located within the body; and
    wherein the flow passage and the body have a unitary construction and wherein the plurality of flow passages are separated from one another by at least one separation wall having a thickness wherein the thickness of the separation wall varies along a longitudinal direction.

10. A unitary conduit according to claim 8 wherein at least one flow passage has a first cross sectional shape near the inlet end and a second cross sectional shape near the exit end.

11. A unitary conduit for transporting a fluid, the conduit comprising:
    a body made from a metallic material, the body having an exterior contour;
    a flow passage located within the body, said flow passage having an interior contour, an inlet end and an exit end, wherein the exterior contour of the body generally conforms to the interior contour of the flow passage and is adapted to facilitate a reduction in stress; and
    wherein the flow passage and the body have a unitary construction and wherein the flow passage has a first cross sectional shape near the inlet end and a second cross sectional shape near the exit end wherein the cross sectional shape of the flow passage changes substantially uniformly from the first cross sectional shape near the inlet end to the second cross sectional shape near the exit end.

12. A unitary conduit according to claim 11 wherein the flow passage has a first cross sectional shape near the inlet end and a second cross sectional shape near the exit end wherein the first cross sectional shape is substantially circular and the second cross sectional shape is substantially non-circular.

13. A unitary conduit for transporting a fluid, the conduit comprising:
    a body; and
    a flow passage located within the body, said flow passage having an inlet end, wherein the flow passage branches to a plurality of sub-passages located within the body and wherein the flow passage and the body have a unitary construction and wherein the body is made using a metallic powder and has a contour adapted to facilitate a reduction in stress.

14. A unitary conduit according to claim 13 wherein the cross sectional shape of a sub-passage changes in a longitudinal direction.

* * * * *